US008866372B2

(12) United States Patent
Beers et al.

(10) Patent No.: US 8,866,372 B2
(45) Date of Patent: Oct. 21, 2014

(54) PHOSPHOR SYSTEM FOR IMPROVED EFFICACY LIGHTING SOURCES

(75) Inventors: William Winder Beers, Chesterland, OH (US); Jon Bennett Jansma, Pepper Pike, OH (US); Fangming Du, Northfield, OH (US); William Erwin Cohen, Solon, OH (US); Alok Mani Srivastava, Niskayuna, NY (US); Samuel Joseph Camardello, Albany, NY (US); Holly Ann Comanzo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/310,920

(22) Filed: Dec. 5, 2011

(65) Prior Publication Data

US 2013/0140978 A1    Jun. 6, 2013

(51) Int. Cl.
*H01J 61/44*    (2006.01)

(52) U.S. Cl.
USPC .......................................... 313/487; 313/483

(58) Field of Classification Search
USPC ........... 313/487, 612, 627–643; 252/301.4 R, 252/301.6 P, 301.4 P
See application file for complete search history.

(56) References Cited

U.S. PATENT DOCUMENTS

| 4,847,533 | A | 7/1989 | Hoffman |
| 5,854,533 | A | 12/1998 | Pappalardo |
| 6,222,312 | B1 | 4/2001 | Ghosh et al. |
| 7,119,488 | B2 | 10/2006 | Soules et al. |
| 7,786,661 | B2 | 8/2010 | Deme et al. |
| 2002/0117966 | A1* | 8/2002 | Vose et al. ..................... 313/635 |
| 2007/0170834 | A1 | 7/2007 | Jansma |
| 2008/0191601 | A1 | 8/2008 | Dekker |
| 2009/0079324 | A1* | 3/2009 | Deme et al. .................. 313/489 |
| 2009/0309482 | A1 | 12/2009 | Srivastava et al. |

FOREIGN PATENT DOCUMENTS

WO    2011054691 A1    5/2011

OTHER PUBLICATIONS

EP Search Report and Opinion dated Apr. 30, 2014 from corresponding EP Application No. 12194843.4.

* cited by examiner

*Primary Examiner* — Tracie Y Green (74) *Attorney, Agent, or Firm* — Global Patent Operation; Peter T. DiMauro (57) ABSTRACT

Mercury vapor discharge fluorescent lamps are provided. The lamp can include a lamp envelope enclosing a discharge space and having an inner surface. First and second electrodes can be positioned on the lamp, such as on opposite ends of the lamp envelope. An ionizable medium that includes mercury and an inert gas can be within said lamp envelope. A phosphor layer can be on the inner surface of the lamp envelope. The phosphor layer generally includes a phosphor blend of a calcium halophosphor, a blue phosphor having an emission peak at about 440 nm to about 490 nm, a blue-green phosphor having an emission peak at about 475 nm to about 530 nm, and a red phosphor having an emission peak at about 600 nm to about 650 nm.

18 Claims, 8 Drawing Sheets

PHOSPHOR SYSTEM FOR IMPROVED EFFICACY LIGHTING SOURCES

FIELD OF THE INVENTION

The present invention generally relates to phosphor compositions, particularly phosphors for use in fluorescent lamps. More particularly, the present invention relates to improving the efficacy of a fluorescent lamp by providing an optimized blend of four or more phosphors for use therein.

BACKGROUND

Fluorescent lamps typically have a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the 254 nm Hg-resonance wave; the phosphor is activated so as to convert ultraviolet light into visible light. In order to improve the color-rendering properties and emission output of fluorescent lamps, efficient illumination of a white color has been recently provided using a three-band type fluorescent lamp which employs a mixture of red, green and blue-emitting phosphors. In such a three-band type phosphor lamp, the emitting colors of the respective phosphors are considerably different from one another. Therefore, if the emitting intensity of any of the three corresponding phosphors is decreased, color deviation occurs, degrading the color-rendering properties of the lamp. For example, $LaPO_4:Ce^{3+},Tb^{3+}$ (LAP) has been typically used as a green phosphor in combination with other phosphors (i.e., a red and blue phosphor). However, LAP is relatively expensive and can greatly increase the cost of the lamp.

Thus, a need exists for a phosphor blend that better matches the eye sensitivity curve, especially while avoiding the use of LAP in the lamp in order to reduce costs.

BRIEF DESCRIPTION OF THE INVENTION

Aspects and advantages of the invention will be set forth in part in the following description, or may be obvious from the description, or may be learned through practice of the invention.

Mercury vapor discharge fluorescent lamps are generally provided. In one embodiment, the lamp includes a lamp envelope enclosing a discharge space and having an inner surface. An ionizable medium that includes mercury and an inert gas is within said lamp envelope. A phosphor layer is disposed on the inner surface of the lamp envelope. The phosphor layer generally includes a phosphor blend of a calcium halophosphor, a blue phosphor having an emission peak at about 440 nm to about 490 nm, a blue-green phosphor having an emission peak at about 475 nm to about 530 nm, and a red phosphor having an emission peak at about 600 nm to about 650 nm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of embodiments of the invention.

As used herein, a "fluorescent lamp" is any mercury vapor discharge fluorescent lamp as known in the art, including fluorescent lamps wherein the discharge generator can include having electrodes, and electrode-less fluorescent lamps wherein the discharge generator includes a radio transmitter adapted to excite mercury vapor atoms via transmission of an electromagnetic signal.

Figure 1:
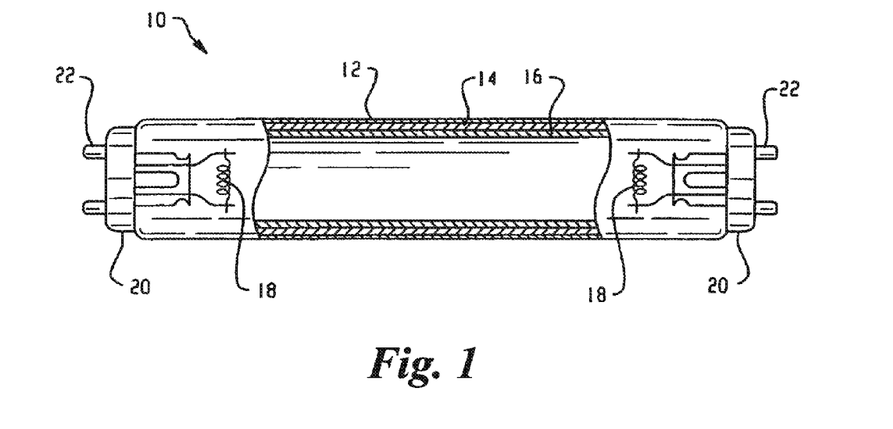
FIG. 1 is a schematic cross-section of a mercury vapor discharge fluorescent lamp.

Referring to FIG. 1, there is depicted a representative mercury vapor discharge fluorescent lamp 10 comprising an elongated light-transmissive glass tube or envelope 12 (e.g., a soda-lime silicate glass envelope) having a circular cross-section. The low pressure mercury discharge assembly in said lamp includes a pair of spaced conventional electrode structures 18 at each end connected to electrical contacts 22 of a base 20 fixed at both ends of the sealed glass envelope 12. The discharge-sustaining filling in said sealed glass envelope is an inert gas such as argon or a mixture of argon and other inert gases at a low pressure in combination with a small quantity of mercury to provide the low vapor pressure manner of lamp operation. For example, a discharge-sustaining fill gas of mercury and an inert gas can be sealed in the interior volume inside the glass tube 12. The inert gas desirably is argon or a mixture of argon and krypton, but could be some other inert gas or mixture of inert gases. The inert gas and a small quantity of mercury vapor provide the low vapor pressure manner of operation. Preferably, the mercury vapor has a pressure in the range of 4 to 6 millitorr.

Disposed on the inner surface of the glass envelope is a phosphor layer comprising a phosphor blend, as described below. As used herein, "disposed" on an inner surface can refer to the phosphor layer being directly on the envelope, or on at least one other layer(s) which are on the envelope. In one embodiment of the invention, the lamp 10 may have a second layer 14 positioned between the phosphor blend layer 16 and the inner surface of the glass envelope 12. This second layer 14 can be, for instance, an ultraviolet reflecting barrier layer as is known in the art. Such a barrier layer can comprise, for example, alpha-alumina particles and/or gamma-alumina particles.

The phosphor layer 16 generally includes a phosphor blend of at least one of each of a calcium halophosphor, a blue phosphor having an broad-spectrum emission peak at about 440 nm to about 490 nm (e.g., about 440 nm to about 460 nm), a blue-green phosphor having an emission peak at about 475 nm to about 530 nm (e.g., about 480 nm to about 525 nm), and a red phosphor having an emission peak at about 600 nm to about 650 nm (e.g., about 605 nm to about 625 nm). Accordingly, the phosphor blend can be, in one particular embodiment, substantially free from other phosphors (i.e., those other phosphors not falling into one of the four phosphor types of calcium halophosphor, blue phosphor, blue-green phosphor, or red phosphor), including in particular $LaPO_4$: $Ce^{3+},Tb^{3+}$. As used herein, the term "substantially free" means no more than an insignificant trace amount present and encompasses completely free (e.g., 0 wt. % up to 0.01 wt. %).

Calcium halophosphors are generally non-rare earth phosphors that include a halogen (e.g., Cl, F, Br) or a combination of halogens. Particularly suitable calcium halophosphors include fluorapatite ($Ca_{10}(PO_4)_6F_2$), chlorapatite ($Ca_{10}(PO_4)_6Cl_2$), and bromapatite ($Ca_{10}(PO_4)_6Br_2$) or a combination thereof (generally, $Ca_{10}(PO_4)_6(F,Cl,Br)_2$) doped with antimony (Sb) and/or manganese (Mn). For example, one particularly suitable calcium halophosphor can be $Ca_{10}(PO_4)_6(F,Cl)_2$:Sb, Mn.

The phosphors suitable for use in the embodiments of the present invention include any that are capable of absorbing ultraviolet light and emitting light in the stated region (i.e., blue, blue-green, and red). Although not intended to be limiting, examples of suitable phosphors of each type are listed below.

For example, suitable blue phosphors include, but are not limited to, $(Ba,Sr,Ca)_5(PO_4)_3(Cl,F,OH):Eu^{2+}$, $Mn^{2+}$, $Sb^{3+}$; $(Ba,Sr,Ca)MgAl_{10}O_{17}:Eu^{2+},Mn^{2+}$; $(Ba,Sr,Ca)BPO_5:Eu^{2+}$, $Mn^{2+}$; $(Sr,Ba)MgAl_{10}O_{17}:Eu^{2+}$; $(Sr,Ca,Ba)_5(PO_4)_4Cl:Eu^{2+}$; $(Ba,Ca)_5(PO_4)_3Cl:Eu^{2+}$, or a combination thereof.

Suitable blue-green phosphors include, but are not limited to, $Sr_4Al_{14}O_{25}:Eu^{2+}$; $BaAl_8O_{13}:Eu^{2+}$; $2SrO—0.84P_2O_{5-0.16}B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Eu^{2+}$, $Mn^{2+}$, $Sb^{3+}$; or combinations thereof.

Suitable red phosphors include, but are not limited to, $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9$: $Eu^{3+}$; $(Ca,Sr)(Gd,Y)_3(Ge,Si)Al_3O_9:Eu^{3+}$; $Y(V,P)O_4:Eu^{3+}$; $(Y,Gd,La,Lu)_3GaO_6:Eu^{3+}$; $(Sr,Mg)_3(PO_4)_2$: $Sn^{2+}$; $3.5MgO—0.5MgF_2—GeO_2:Mn^{4+}$; $GdMgB_5O_{10}$: $Ce^{3+},Mn^{2+}$, or combinations thereof.

In one particular embodiment, the calcium halophosphor can be $Ca_{10}(PO_4)_6(F,Cl)_2$:Sb, Mn, the blue phosphor can be barium magnesium aluminate activated by europium (BAM), the blue-green phosphor can be barium magnesium aluminate activated by europium and manganese (BAMn), and the red phosphor can be yttrium oxide activated by europium (YEO). For example, the phosphor blend can be (e.g., can consist essentially of or can consist of) a combination of $[Ca_{10}(PO_4)_6(F,Cl)_2$:Sb, Mn], barium magnesium aluminate activated by europium, barium magnesium aluminate activated by europium and manganese, and yttrium oxide activated by europium.

In one particular embodiment, the phosphor blend may generally contain about 0.1 wt. % to about 10 wt. % of the blue phosphor, about 1 wt. % to about 20 wt. % of the blue-green phosphor, about 20 wt. % to about 45 wt. % of the red phosphor, and about 20 wt. % to about 60 wt. % of the calcium halophosphor in terms of the total weight of phosphors in the phosphor layer. For example, the phosphor blend may generally contain about 1 wt. % to about 5 wt. % of the blue phosphor, about 10 wt. % to about 18 wt. % of the blue-green phosphor, about 30 wt. % to about 35 wt. % of the red phosphor, and/or about 40 wt. % to about 55 wt. % of the calcium halophosphor in terms of the total weight of the phosphors in the phosphor layer. As used herein, the term wt. % (i.e., weight percent) is calculated by dividing the total weight of the dried component by the total weight of the dried layer, multiplied by 100. Thus, the sum of the wt. percent of all the phosphor components in the phosphor blend will be 100%. If other components (binders, etc.) are present in the phosphor blend, such other components are generally not phosphors.

However, the relative proportions of the individual phosphors in the phosphor blend may be adjusted such that when their emissions are blended, there is produced visible light of predetermined x and y values of CIE coordinates wherein the x value may be in the range of about 0.25 to about 0.46 (e.g., 0.30 to about 0.40), and said y value may be in the range of about 0.30 to about 0.42. Additionally, the relative proportions of the components are such that the resulting light exhibits an increased luminous efficacy as compared to a tri-component blend formed from a tri-phosphor component blend consisting of one each of a conventional green, red and blue phosphor.

The above-described inventive combination of phosphors can result in increased luminosity over conventional tri-phosphor blends due to their increased emission in the spectral regions in which the eye is particularly sensitive. The color correlated temperature (CCT) of the blend can range from about 2500-10000 K, depending on the identity and exact mass fraction of each phosphor in the system. As used herein, the terms "luminosity" and "luminous efficacy" are synonymous.

The apparent color of a light source is described in terms of color temperature, which is the temperature of a black body that emits radiation of about the same chromaticity as the radiation considered. A light source having a color temperature of 3000 Kelvin has a larger red component than a light source having a color temperature of 4100 Kelvin. The color temperature of a lamp using a phosphor blend can be varied by changing the ratio of the phosphors.

Color quality is further described in terms of color rendering, and more particularly color rendering index (CRI or $R_a$), which is a measure of the degree to which the psycho-physical colors of objects illuminated by a light source conform to those of a reference illuminant for specified conditions. CRI is in effect a measure of how well the spectral distribution of a light source compares with that of an incandescent (black-body) source, which has a Planckian distribution between the infrared (over 700 nm) and the ultraviolet (under 400 nm). The discrete spectra which characterize phosphor blends will yield good color rendering of objects whose colors match the spectral peaks, but not as good of objects whose colors lie between the spectral peaks.

The color appearance of a lamp is described by its chromaticity coordinates which can be calculated from the spectral power distribution according to standard methods. See CIE, Method of measuring and specifying color rendering properties of light sources (2nd ed.), Publ. CIE No. 13.2 (TC-3, 2), Bureau Central de la CIE, Paris, 1974. The CIE standard chromaticity diagram includes the color points of black body radiators at various temperatures. The locus of black body chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or lm/W).

In one embodiment of the present invention, a phosphor blend for use in a light source having a color rendering index of at least 85 resulting in improved luminosity over conventional tri-phosphor blends for a given color temperature is provided, such as at least 87 (e.g., about 88 to about 90).

The phosphor layers discussed above can be formed by any effective method, including some known procedures including deposition from liquid suspensions and electrostatic deposition. For example, the phosphor can be deposited on the glass surface from a conventional aqueous suspension including various organic binders and adherence promoting agents. Said aqueous suspension is applied and then dried in the conventional manner.

The phosphors for use in the present invention may be made by any effective method, including some conventional methods including a ceramic powder method, a liquid phase (flux) method, or a solid state method.

Additional additives may be included in the phosphor blend and can include a dispersion vehicle, binder and one or more of various known non-luminescent additives, including, e.g., alumina, calcium phosphate, thickeners, dispersing agents, and certain borate compounds as are known in the art.

In the coating procedure typically the various phosphor powders can be blended by weight. The resulting powder can then dispersed in a water based system (which may contain other additives as are known in the art, including adherence promoters such as fine non-luminescent particles of alumina or calcium pyrophosphate) optionally with a dispersing agent as is known in the art. A thickener may be added, typically polyethylene oxide. The suspension can then typically diluted with deionized water until it is suitable for producing a coating of the desired thickness or coating weight. The phosphor blend suspension can then be applied as a coating to the inside of the glass tube (preferably by pouring the suspension down the inside of a vertically-held tube or pumping the suspension up into same) and heated by forced air until dry, as is known in the art. After the first thin coat or layer is applied, additionally desired thin coats or layers may be applied in the same manner, carefully drying each coat before the next coat is applied. Accordingly, the thin layers can be built up until the total or cumulative coating thickness is sufficient to absorb substantially all of the UV light produced by the arc. Although not intended to be limiting, this typically corresponds to a thickness of between about 1 and about 25 microns, preferably between 1 and 10 microns, depending on the exact composition of the phosphor blend and the particle size of the phosphors.

For example, the phosphor layer can be applied onto the inner surface of the lamp at about 1 $mg/cm^2$ to about 6 $mg/cm^2$, such as about 1 $mg/cm^2$ to about 4 $mg/cm^2$.

For convenience, the discussion and examples described herein refer to the use of the phosphor blend layer in Hg-based fluorescent lamps. However, it should be recognized that the inventive concepts include applications relating to other light sources incorporating phosphors as well, such as white LED's, xenon based discharge lamps, and plasma display panels. For example, the material may be used as a phosphor in lamp, in a cathode ray tube, in a plasma display device or in a liquid crystal display. The material may also be used as a scintillator in an electromagnetic calorimeter, in a gamma ray camera, in a computed tomography scanner or in a laser. These uses are meant to be merely exemplary and not exhaustive. In a preferred embodiment, the phosphor is used in a fluorescent light, as described above.

Figure 2:
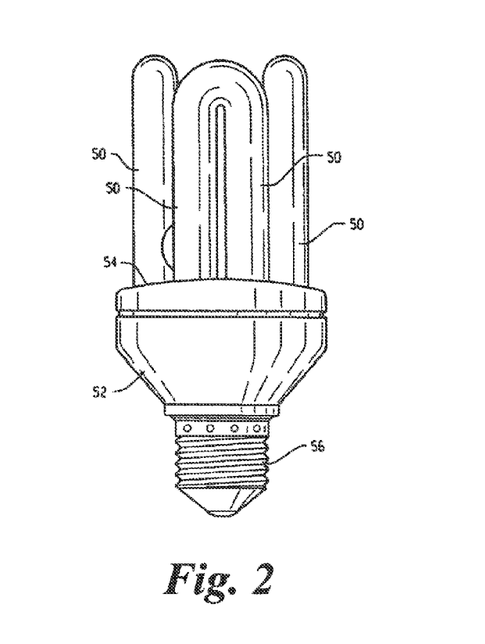
FIG. 2 is a cross-section of a compact fluorescent lamp according to an embodiment of the present invention.
Figure 3:
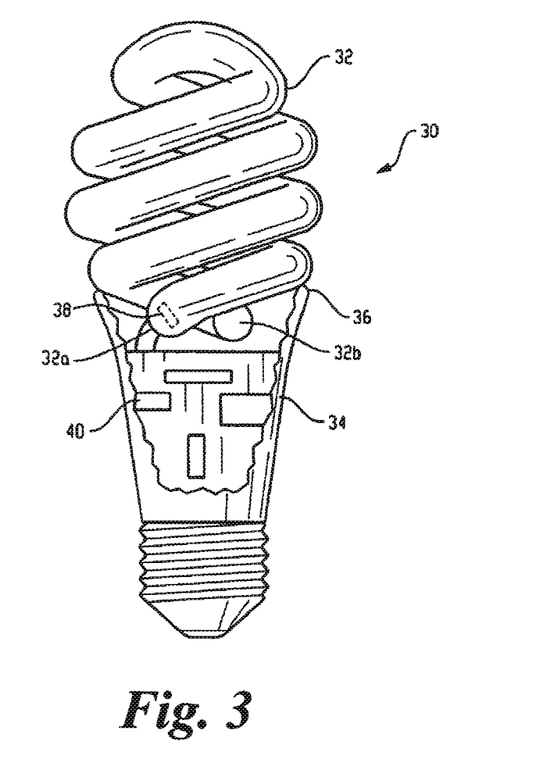
FIG. 3 is a cross-section of an alternate compact fluorescent lamp according to another embodiment of the present invention.

While the invention has been described in detail and with reference to specific embodiments thereof, it will be apparent to one skilled in the art that various changes and modifications can be made therein without departing from the spirit and scope of the invention. For example, as can be seen in FIGS. 2 and 3, the phosphor blend described herein can be used in a compact fluorescent lamp arrangement. With reference to FIG. 3, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34. With respect to FIG. 2, a compact fluorescent lamp having a fluorescent tube 50, a housing 52 closed by a cap 54 and, according to the example, a screw base 56 is seen in side view. The compact fluorescent lamp is connected electrically to the mains through the base known in the art, and wires coming from the connection portions of the base are connected to a ballast circuit arranged inside the housing 52 and/or to electrodes of the fluorescent tube 50. The phosphor blend can be used as a phosphor layer applied on the inner surface of the lamp envelope 32 or tube 50, as discussed above with respect to FIG. 1.

When reciting the chemical formulae for phosphors, the element(s) following the colon represents activator(s). As used herein throughout this disclosure, the term "doped" is equivalent to the term "activated". For purposes of the present disclosure, it should be understood that when a phosphor has two or more dopant ions (i.e. those ions following the colon in the above compositions), this is to mean that the phosphor has at least one (but not necessarily all) of those dopant ions within the material. That is, as understood by those skilled in the art, this type of notation means that the phosphor can include any or all of those specified ions as dopants in the formulation.

The various phosphors of any color described herein can have different elements enclosed in parentheses and separated by commas, such as in $(Ba,Sr,Ca)MgAl_{10}O_{17}:Eu^{2+}$, $Mn^{2+}$ phosphor. As would be understood by anyone skilled in the art, the notation (A,B,C) signifies $(A_xB_yC_z)$ where $0 \leq x \leq 1$ and $0 \leq y \leq 1$ and $0 \leq z \leq 1$ and $x+y+z=1$. For example, (Sr,Ca,Ba) signifies $(Sr_xCa_yBa_z)$ where $0 \leq x \leq 1$ and $0 \leq y \leq 1$ and $0 \leq z \leq 1$ and $x+y+z=1$. Typically, but not always, x, y, and z are all nonzero. The notation (A,B) signifies $(A_xB_y)$ where $0 \leq x \leq 1$ and $0 \leq y \leq 1$ and $x+y=1$. Typically, but not always, x and y are both nonzero.

EXAMPLES

Exemplary lamps were produced having a phosphor layer on its inner surface of the envelope. The phosphor layer included a blend of $Ca_{10}(PO_4)_6(F,Cl)_2$:Sb, Mn, barium magnesium aluminate activated by europium (BAM), barium magnesium aluminate activated by europium and manganese (BAMn), and yttrium oxide activated by europium (YEO).

Figure 4:
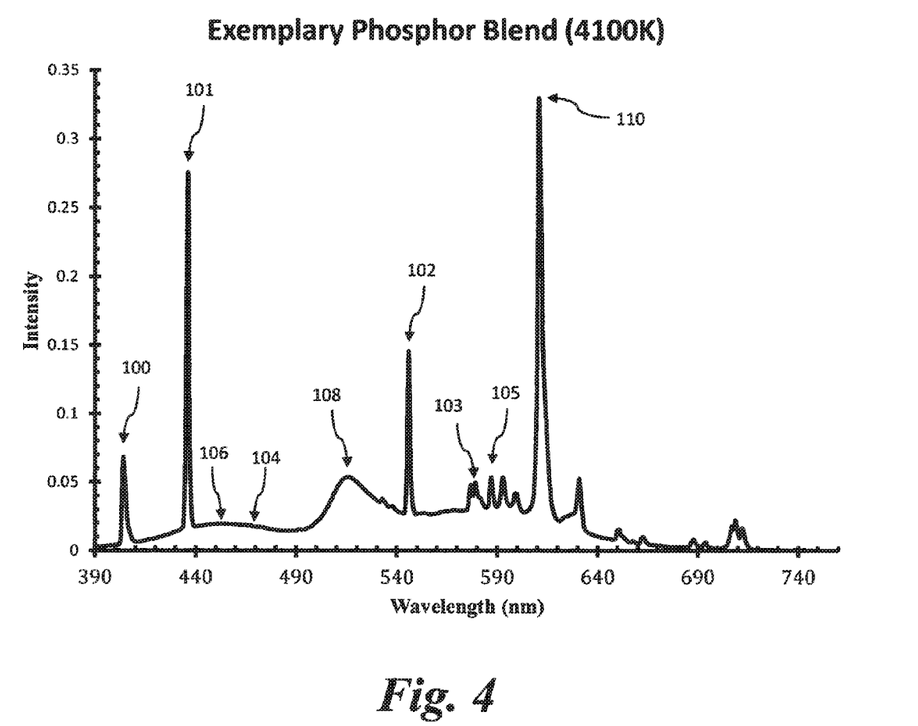
FIG. 4 shows an averaged emission spectrum of an exemplary phosphor blend at a correlated color temperature of 4100K.
Figure 6:
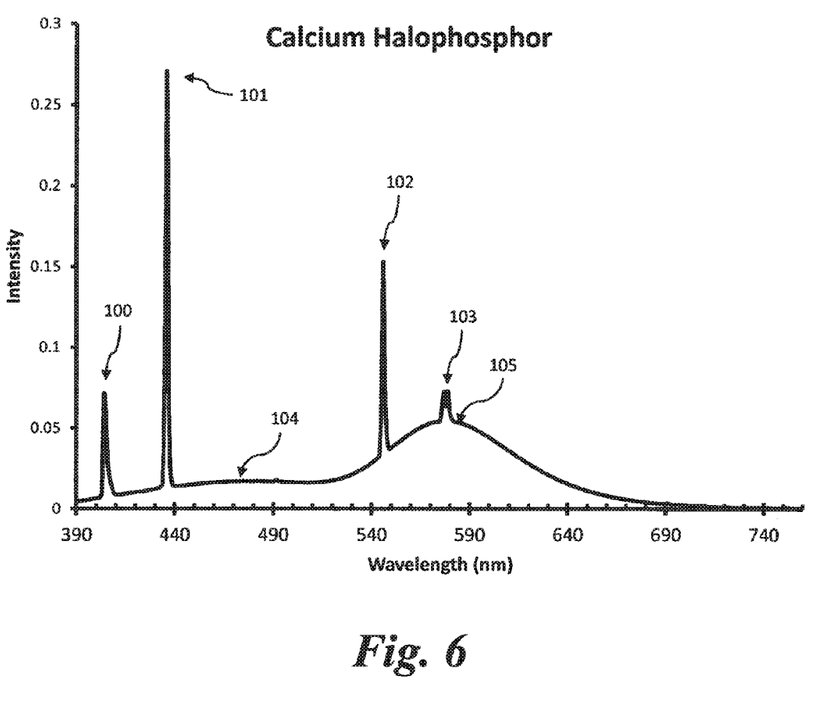
FIG. 6 shows an emission spectrum of the calcium halophosphor $(Ca_{10}(PO_4)_6(F,Cl)_2:Sb, Mn)$ that was used to form the exemplary phosphor layers.
Figure 7:
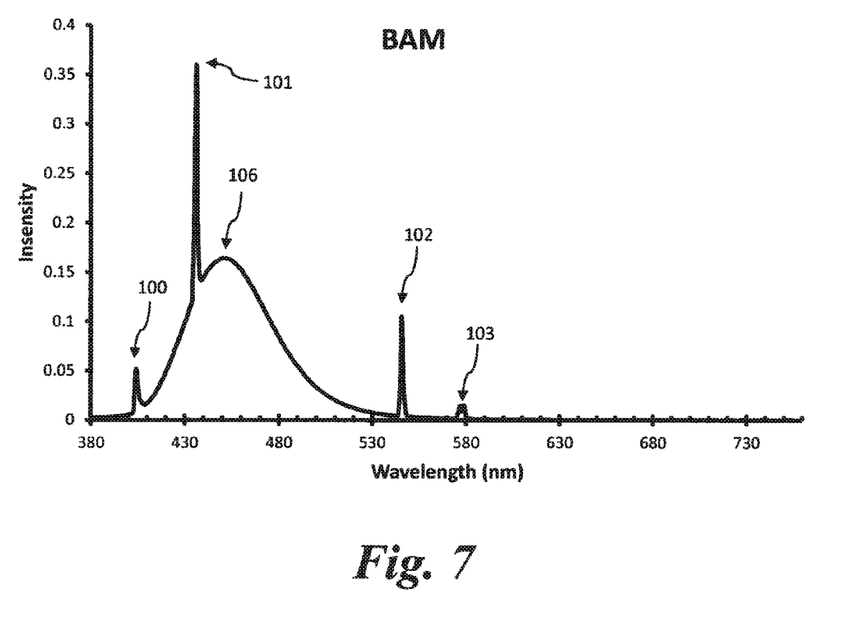
FIG. 7 shows an emission spectrum of BAM that was used to form the exemplary phosphor layers.
Figure 8:
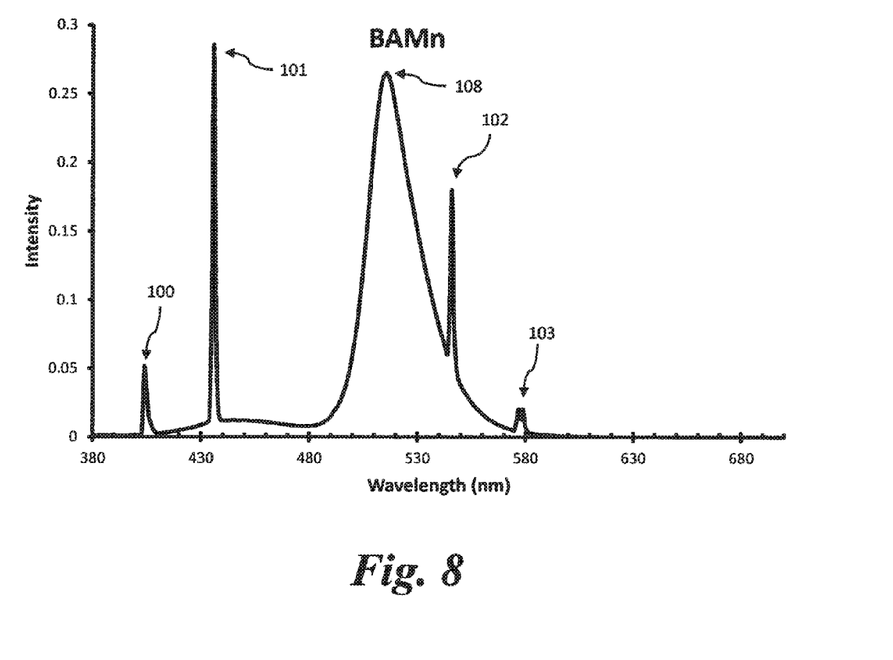
FIG. 8 shows an emission spectrum of BAMn that was used to form the exemplary phosphor layers.
Figure 9:
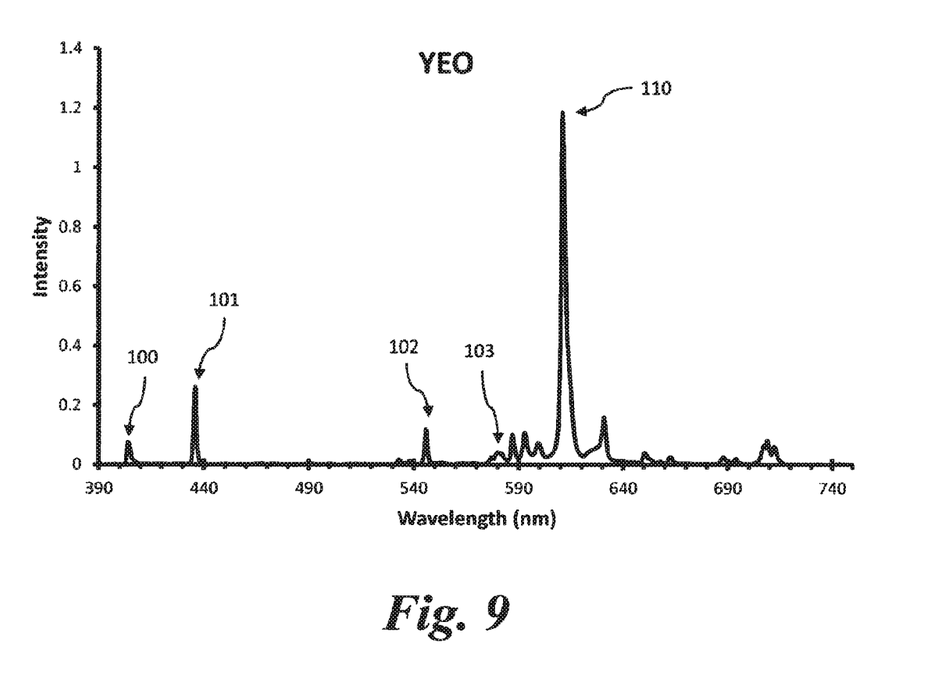
FIG. 9 shows an emission spectrum of YEO that was used to form the exemplary phosphor layers.

FIG. 4 shows an averaged emission spectrum of the exemplary phosphor blend at a correlated color temperature of 4100K. The exemplary phosphor blend of this example had an average CRI of 89, and an average LPW of 79.4. As shown, the phosphor blend emitted light across the visible wavelengths, with YEO present at about 32.7 wt. % of the phosphor blend, BAM present at about 2.6 wt. % of the phosphor blend, BAMn present at about 15.7 wt. % of the phosphor blend, and the calcium halophosphor present at about 49.0 wt. % of the phosphor blend. Peaks 100, 101, 102, and 103 are attributable to the mercury discharge, at about 405 nm, 435 nm, 545 nm, and about 580 nm, respectively. Peaks 104 and 105 are attributable to the calcium halophosphor, as shown in FIG. 6. Peak 106 is attributable to BAM, as shown in FIG. 7. Peak 108 is attributable to BAMn, as shown in FIG. 8. Finally, peak 110 is attributable to YEO, as shown in FIG. 9.

Figure 5:
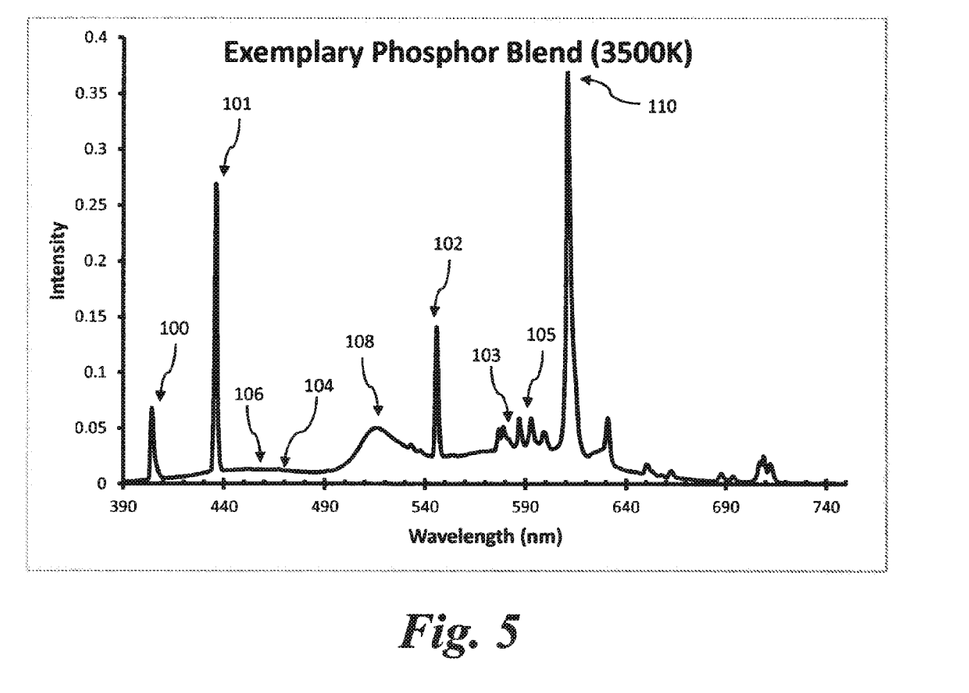
FIG. 5 shows an averaged emission spectrum of an exemplary phosphor blend at a correlated color temperature of 3500K.

FIG. 5 shows an averaged emission spectrum of the exemplary phosphor blend at a correlated color temperature of 3500K. The exemplary phosphor blend of this example had an average CRI of 89, and an average LPW of 80.6. As shown, the phosphor blend emitted light across the visible wavelengths, with YEO present at about 35.6 wt. % of the phosphor blend, BAM present at about 1.2 wt. % of the phosphor blend, BAMn present at about 14.8 wt. % of the phosphor blend, and the calcium halophosphor present at about 48.4 wt. % of the phosphor blend. Peaks 100, 101, 102, and 103 are attributable to the mercury discharge, at about 405 nm, 435 nm, 545 nm, and about 580 nm, respectively. Peaks 104, 105 are attributable to the calcium halophosphor, as shown in FIG. 6. Peak 106 is attributable to BAM, as shown in FIG. 7. Peak 108 is attributable to BAMn, as shown in FIG. 8. Finally, peak 110 is attributable to YEO, as shown in FIG. 9.

FIG. 6 shows an emission spectrum of the calcium halophosphor ($Ca_{10}(PO_4)_6(F,Cl)_2$:Sb, Mn) that was used to form the exemplary phosphor layers, with an emission peak 104 at about 470 nm and an emission peak 105 at about 580 nm to 590 nm.

FIG. 7 shows an emission spectrum of BAM that was used to form the exemplary phosphor layers, with an emission peak at 106 at about 450 nm to about 455 nm.

FIG. 8 shows an emission spectrum of BAMn that was used to form the exemplary phosphor layers, with an emission peak at 108 at about 515 nm.

FIG. 9 shows an emission spectrum of YEO that was used to form the exemplary phosphor layers, with an emission peak at 110 at about 610 nm to about 615 nm.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mercury vapor discharge fluorescent lamp, comprising:
   a lamp envelope enclosing a discharge space and having an inner surface;
   an ionizable medium within said lamp envelope comprising mercury and an inert gas; and
   a phosphor layer comprising a phosphor blend disposed on said inner surface,
   said phosphor blend comprising: a calcium halophosphor, a blue phosphor having an emission peak at about 440 nm to about 490 nm, a blue-green phosphor having an emission peak at about 475 nm to about 530 nm, and a red phosphor having an emission peak at about 600 nm to about 650 nm,
   wherein said phosphor blend is substantially free of phosphors not falling into one of the four phosphor types of said calcium halophosphor, said blue phosphor, said blue-green phosphor, and said red phosphor; and
   wherein said lamp having a color rendering index of at least about 85.

2. The lamp as in claim 1, wherein the phosphor blend comprises about 0.1 wt. % to about 10 wt. % of the blue phosphor, about 1 wt. % to about 20 wt. % of the blue-green phosphor, about 20 wt. % to about 45 wt. % of the red phosphor, and about 20 wt. % to about 60 wt. % of the calcium halophosphor.

3. The lamp as in claim 1, wherein the phosphor blend comprises about 1 wt. % to about 5 wt. % of the blue phosphor, about 1 wt. % to about 18 wt. % of the blue-green phosphor, about 30 wt. % to about 35 wt. % of the red phosphor, and about 40 wt. % to about 55 wt. % of the calcium halophosphor.

4. The lamp as in claim 1, wherein the calcium halophosphor comprises a fluorapatite, chlorapatite, bromapatite, or a combination thereof, doped with antimony and/or manganese.

5. The lamp as in claim 1, wherein the calcium halophosphor comprises $Ca_{10}(PO_4)_6(F,Cl)_2$:Sb, Mn.

6. The lamp as in claim 1, wherein the calcium halophosphor comprises $Ca_{10}(PO_4)_6F_2$:Sb, Mn.

7. The lamp as in claim 1, wherein the calcium halophosphor comprises $Ca_{10}(PO_4)_6Br_2$:Sb, Mn.

8. The lamp as in claim 1, wherein the phosphor blend comprises $(Ba,Sr,Ca)_5(PO_4)_3(Cl,F,OH):Eu^{2+}, Mn^{2+}, Sb^{3+}$; $(Ba,Sr,Ca)MgAl_{10}O_{17}:Eu^{2+},Mn^{2+}$; $(Ba,Sr,Ca)BPO_5:Eu^{2+}, Mn^{2+}$; $(Sr,Ba)MgAl_{10}O_{17}:Eu^{2+}$; $(Sr,Ca,Ba)_5(PO_4)_4Cl:Eu^{2+}$; $(Ba,Ca)_5(PO_4)_3Cl:Eu^{2+}$, or a combination thereof.

9. The lamp as in claim 1, wherein the blue phosphor comprises barium magnesium aluminate activated by europium.

10. The lamp as in claim 1, wherein the phosphor blend comprises $Sr_4Al_{14}O_{25}:Eu^{2+}$; $BaAl_8O_{13}:Eu^{2+}$; $2SrO-0.84P_2O_{5-0.16}B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Eu^{2+}, Mn^{2+},Sb^{3+}$; or combinations thereof.

11. The lamp as in claim 1, wherein the blue-green phosphor comprises barium magnesium aluminate activated by europium and manganese.

12. The lamp as in claim 1, wherein the red phosphor comprises $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $YVO_4:Eu^{3+}$; $(Y,Gd,La,Lu)_3GaO_6:Eu^{3+}$; $(Sr,Mg)_3(PO_4)_2:Sn^{2+}$; $3.5MgO-0.5MgF_2—GeO_2:Mn^{4+}$; $GdMgB_5O_{10}:Ce^{3+},Mn^{2+}$, or combinations thereof.

13. The lamp as in claim 1, wherein the red phosphor comprises yttrium oxide activated by europium.

14. The lamp as in claim 1, wherein the phosphor blend is substantially free from $LaPO_4:Ce^{3+},Tb^{3+}$.

15. The lamp as in claim 1, further comprising a UV reflecting barrier layer between said phosphor layer and said lamp envelope.

16. The lamp as in claim 1, wherein said phosphor layer is present on the inner surface of the lamp at about 1 mg/cm$^2$ to about 6 mg/cm$^2$.

17. The lamp as in claim 1, wherein said phosphor blend consists essentially of the calcium halophosphor, the blue phosphor having an emission peak at about 440 nm to about 490 nm, the blue-green phosphor having an emission peak at about 475 nm to about 530 nm, and the red phosphor having an emission peak at about 600 nm to about 650 nm.

18. The lamp as in claim 1, wherein said phosphor blend consists essentially of $Ca_{10}(PO_4)_6(F,Cl,Br)_2$:Sb, Mn, barium magnesium aluminate activated by europium, barium magnesium aluminate activated by europium and manganese, and yttrium oxide activated by europium.

* * * * *